J. GREACEN, Jr.
Hydraulic-Hose.

No. 151,383.　　　　　　　　　　　Patented May 26, 1874.

Witnesses.　　　　　　　　　　　Inventor.

UNITED STATES PATENT OFFICE.

JOHN GREACEN, JR., OF NEW YORK, N. Y.

IMPROVEMENT IN HYDRAULIC HOSE.

Specification forming part of Letters Patent No. 151,383, dated May 26, 1874; application filed December 23, 1873.

*To all whom it may concern:*

Be it known that I, JOHN GREACEN, Jr., of the city, county, and State of New York, have invented a new and Improved Hose; and that the following is a full, clear, and exact description of the same, reference being had to the accompanying drawings, and to the letters of reference marked thereon, making a part of this specification:

This invention is in the nature of an improvement in hose; and the invention consists in a hose constructed with recesses at its ends, within which may be fitted, after vulcanization, the metallic couplings, in such manner as will make the bores of the couplings coincident with the bore of the hose, without obstruction, substantially as is hereinafter described.

While the invention relates more particularly to what is known as suction-hose, yet it is applicable and useful to hose of any kind.

Hose is ordinarily constructed with a uniform diameter throughout, ends and all, so that when the couplings are inserted the ends are simply expanded around the coupling, leaving the edge of the coupling exposed within the hose to form a shoulder or contraction, against which chips, straws, and other substances may lodge, and by their accumulation impede and finally stop the flow of fluid through the hose.

The difficulty just described is fully obviated by my invention, as will be seen from the following description and accompanying drawings, wherein—

Figure 1:
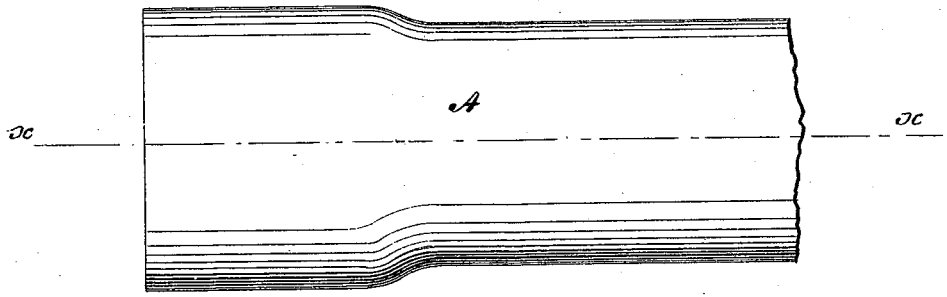
Figure 2:
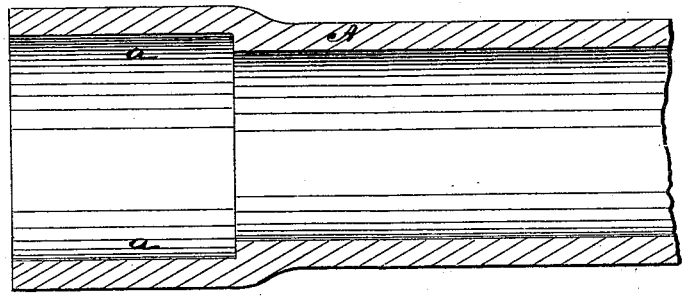

Figure 1 is a side elevation of my improved hose; and Fig. 2, a longitudinal section of same.

Similar letters of reference indicate like parts in the several figures.

A represents a section of rubber hose, which may be of any desired size. Into the ends of this hose is formed a recess, *a*. This recess is constructed by fitting on the end of a mandrel, of the diameter it is proposed to construct the hose, a collar, of the diameter and length it is intended to have the recess, to receive the coupling. The rubber, canvas, and other component parts of the hose are fitted around the collar and mandrel, the mandrel forming the interior bore of the hose, and the collar forming the recess. The hose is then vulcanized by any of the well-known processes, and the hose is complete.

The collar may be made of rubber, metal, or any suitable material.

When the mandrel is withdrawn the hose will be found to have a recess, *a*, at its end to receive the coupling. This recess, having a depth equal to the thickness of the walls of the coupling, the coupling is received within it so as to bring the bore of the coupling and the bore of the hose exactly coincident, no obnoxious break or shoulder being interposed between the two to obstruct the flow of water through the hose, or to present an obstruction against which chips or other foreign substances might lodge and choke the hose.

From the foregoing it will be seen that I construct a hose in such manner as will leave a free and uniform caliber throughout the hose and coupling, insuring a free and unobstructed passage through the hose.

I am aware that hose has been constructed with couplings fitted and secured to it, in the process of vulcanization, and this I do not claim; but

Having thus described my invention, what I claim as new, and desire to secure by Letters Patent, is—

As a new article of manufacture, a hose, constructed with ends recessed, for receiving the coupling, in such manner as to preserve a bore of uniform diameter throughout, substantially as described.

JOHN GREACEN, JR.

Witnesses:
H. C. WATTENBERG,
G. M. PLYMPTON.